(No Model.)

H. E. KIRSTEIN.
EYEGLASSES OR SPECTACLES.

No. 527,612. Patented Oct. 16, 1894.

WITNESSES:
N. E. Paige
Jas. Loughran.

Henry E. Kirstein
INVENTOR

By his Attorneys
Wm. C. Strawbridge
Bonsall Taylor

THE NORRIS PETERS CO., PHOTO-LITHO., WASHINGTON, D. C.

UNITED STATES PATENT OFFICE.

HENRY E. KIRSTEIN, OF ROCHESTER, NEW YORK.

EYEGLASSES OR SPECTACLES.

SPECIFICATION forming part of Letters Patent No. 527,612, dated October 16, 1894.

Application filed October 13, 1893. Serial No. 488,050. (No model.)

*To all whom it may concern:*

Be it known that I, HENRY E. KIRSTEIN, a citizen of the United States, residing at Rochester, in the State of New York, have invented an Improvement in Eyeglasses or Spectacles, of which the following is a specification.

My invention relates to bridge springs employed upon eye glasses and spectacles, and especially to the class of bridge springs known as bar springs, in which the extremital portions or side pieces of the structure are connected in such manner as to have a horizontal sliding movement toward and from each other, and which side pieces are constantly pressed toward each other, or in other words given a contractile tendency, by a spiral or other spring mounted upon the structure at such point as convenience of manufacture or the requirements of the art may dictate.

In the use of eye glasses which are retained in place upon the nose of the wearer by the clasping action due to the contractile tendency of the bridge spring, it has been found that the clasp of the nose pieces is in some cases stronger than is necessary to hold the glasses in place and such as to be uncomfortable to the wearer.

It is the object of my invention to provide a bridge spring with means of a simple, inexpensive, and efficient character by which the extent of its closing action and therefore the degree of pressure of its clasp upon the nose of the wearer may be limited, such means consisting in the application of a nut to one of the slide pins, which is suitably threaded to receive it.

Figure 1:
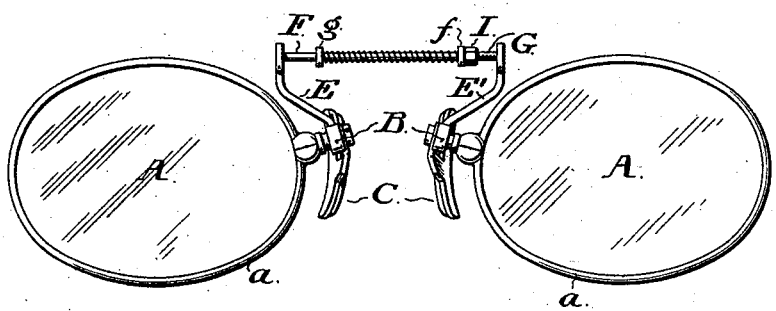
Figure 2:
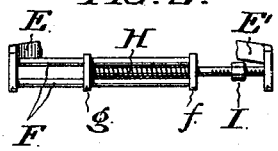

In the drawings, Figure 1 is a view in front elevation of a pair of eye glasses equipped with a good form of my invention. Fig. 2 is a top plan view of the bridge spring of Fig. 1.

Similar letters of reference indicate corresponding parts.

In the accompanying drawings, A A are the lenses, *a* the lens rims, B the clamp posts and C the nose pieces, of glasses in connection with which an ordinary form of bridge bar spring equipped with a good embodiment of my invention is shown.

E E' are the side bars of the bridge spring. F F are a pair of slide pins horizontally projecting, in parallelism, from the side bar E, and the free extremities of which are equipped with a yoke *f*.

G is a side pin horizontally projecting from the side bar E', passing through the yoke *f*, so that its outer portion exists between the pins F F, and equipped at its free extremity with a yoke *g* which embraces the slide pins F F.

H is a spiral spring mounted upon the slide pin G, and bearing as to its respective extremities respectively against the yokes *f* and *g*, the action of which spring is to force the yokes *f g* away from each other and consequently to draw the lenses and nose pieces toward each other.

The construction of the bridge spring so far described is well known in the art, and constitutes a form which I have selected from the numerous different available forms known, as an appropriate one in connection with which to illustrate a typical embodiment of my invention.

Normally the action of the spring H is such as to force the yokes *f g* away from each other and into contact with the upper portions of the side bars E' E, and therefore to force the nose pieces toward and almost into contact with each other.

In order to limit the approach of the lenses, I provide means to limit the closing action of the bridge spring, and such means are shown as consisting of a nut, I, mounted upon one of the slide pins, exterior to the yokes *f g*, the selected slide pin being correspondingly threaded to receive it.

In the drawings, I happen to show that slide pin which is lettered G as the one which is threaded, and the nut I as mounted upon it. This nut, I, will, as will be understood, when mounted upon the slide pin G, be encountered by and serve to stop the yoke *f* as the latter is, by the spiral spring H, forced away from the yoke *g*, and, in thus limiting the separation of the yokes, will limit the approach of the nose pieces through which the bridge spring clasps the nose of the wearer.

As will be understood, the nut, I, may, by suitable rotation, be advanced or retracted, so as to fix, at any desired point, the limit of the approach of the nose pieces.

The place of application of the nut shown in the drawings is not of the essence of the invention inasmuch as said nut would be equally efficient when mounted upon either of the pins F F in lieu of upon the pin G.

Although I have illustrated in the accompanying drawings, herein described, my invention as employed in connection with but one form of bridge spring, I am not to be understood as restricting my invention to employment in connection with the form of bridge spring shown, as it is applicable in connection with all forms of slide pin bridge springs of which I have knowledge. I have not, however, deemed it necessary to illustrate and describe herein more than one form of bridge spring for the reason that, the application of my invention to the bridge spring illustrated being explained, its application to all other forms of bridge springs will be obvious.

I do not herein claim or seek to cover the broad idea of a bridge spring provided with an adjustable stop to prevent the approach of the lenses beyond a selected point, as such subject matter forms a part of the invention of Benjamin A. Gilbert of Boston, Massachusetts, and is set forth in the application for Letters Patent filed by the said Gilbert on August 2, 1893, as Serial No. 482,140, but What I do claim, and desire to secure by Letters Patent, is—

1. In a bridge spring consisting of side bars, slide pins, yokes, and a spring,—a nut, mounted upon and in threaded relationship with respect to one of the slide pins, in such position as to be encountered by a moving part of the bridge spring in the closing movement of the latter, substantially as set forth.

2. In a bridge spring, in combination, side bars, slide pins, a spring, and a nut mounted upon and in threaded relationship with respect to one of said slide pins at a point between the side bars, substantially as set forth.

In testimony that I claim the foregoing as my invention, I have hereunto signed my name this 4th day of October, A. D. 1893.

HENRY E. KIRSTEIN.

In presence of—
GEO. T. PARKER,
LOUIS E. KIRSTEIN.